(12) United States Patent
Hochi

(10) Patent No.: US 8,785,541 B2
(45) Date of Patent: Jul. 22, 2014

(54) RUBBER COMPOSITION AND RUN-FLAT TIRE USING SAME

(75) Inventor: Kazuo Hochi, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 823 days.

(21) Appl. No.: 12/223,609

(22) PCT Filed: Mar. 27, 2007

(86) PCT No.: PCT/JP2007/056355
§ 371 (c)(1),
(2), (4) Date: Aug. 5, 2008

(87) PCT Pub. No.: WO2007/119521
PCT Pub. Date: Oct. 25, 2007

(65) Prior Publication Data
US 2009/0032160 A1 Feb. 5, 2009

(30) Foreign Application Priority Data

Apr. 6, 2006 (JP) ................................. 2006-105234

(51) Int. Cl.
*C08K 3/04* (2006.01)

(52) U.S. Cl.
USPC .......................................... 524/495; 524/496

(58) Field of Classification Search
USPC .......... 152/516, 517, 522, 458, 525; 524/495, 524/496
See application file for complete search history.

(56) References Cited

U.S. PATENT DOCUMENTS

| | | | | |
|---|---|---|---|---|
| 3,867,333 A | * | 2/1975 | Vanderbilt | 524/496 |
| 4,790,365 A | | 12/1988 | Sandstrom et al. | |
| 5,861,454 A | * | 1/1999 | Ikeda et al. | 524/495 |
| 2003/0088013 A1 | * | 5/2003 | Kudo et al. | 524/495 |
| 2003/0191249 A1 | * | 10/2003 | Mori et al. | 525/332.8 |
| 2004/0127621 A1 | * | 7/2004 | Drzal et al. | 524/424 |
| 2005/0182178 A1 | * | 8/2005 | Hochi | 524/447 |
| 2005/0209393 A1 | * | 9/2005 | Hochi | 524/496 |
| 2006/0229404 A1 | * | 10/2006 | Lechtenboehmer | 524/495 |

FOREIGN PATENT DOCUMENTS

| | | |
|---|---|---|
| EP | 1 564 031 A1 | 8/2005 |
| JP | 1-109104 A | 4/1989 |
| JP | 3521193 B2 | 2/2004 |
| JP | 2004-143366 A | 5/2004 |
| JP | 2005-75952 A | 3/2005 |
| JP | 2005-225905 A | 8/2005 |
| JP | 2005-264150 A | 9/2005 |
| JP | 2005-280534 A | 10/2005 |
| WO | WO-2004/013222 A1 | 2/2004 |

OTHER PUBLICATIONS

Chen, G.-H. Polymer Engineering and Science, vol. 414, No. 12, p. 2148-2154, Dec. 2011.*
Kirk-Othmer Encyclopedia of Chemical Technology: Carbon, 2003.*
Website http://www.lookchem.com/Product_734857/CasNo_7782-42-5/Graphite.html.*
European Search Report for Application No. 12165947 dated Jul. 2, 2012.

* cited by examiner

*Primary Examiner* — Peter D Mulcahy
(74) *Attorney, Agent, or Firm* — Birch, Stewart, Kolasch & Birch, LLP

(57) ABSTRACT

The present invention can provide a rubber composition, in which all of strength at break, low heat-build up property, run-flat durability and low fuel consumption can be improved since the rubber composition comprises 5 to 120 parts by weight of flake-like graphite having an average aspect ratio of 3 to 80 and an average particle diameter of 2 to 80 μm on the basis of 100 parts by weight of a diene rubber component, and a run-flat tire using the rubber composition.

9 Claims, No Drawings

RUBBER COMPOSITION AND RUN-FLAT TIRE USING SAME

TECHNICAL FIELD

The present invention relates to a rubber composition and a run-flat tire using the rubber composition.

BACKGROUND ART

In recent years, run-flat tires capable of safety driving even at puncture of a tire have been developed. These tires are provided with a thick reinforcing rubber layer having high elasticity at a sidewall part thereof and therefore keep rigidity when puncture occurs, and also rubber breakage is decreased and running a certain distance is possible even when the tire is subject to bending deformation repeatedly. Accordingly, there is no necessity of always having a spare tire ready and reduction of a whole weight of a vehicle is intended, therefore, fuel cost can be reduced. However, in running a run-flat tire at its puncture, a running speed and distance are limited, and thus it is necessary to improve durability thereof.

JP2005-264150A discloses a rubber composition which comprises specified amounts of a diene rubber, specific carbon black, specific flake-like natural ore, and sulfur or a sulfur compound, thereby having both low heat build-up property and high strength and being capable of improving run-flat durability. There is also disclosed a run-flat tire using the rubber composition for a reinforcing layer of a sidewall part. However, since a flake-like natural ore has a high specific gravity, if it is compounded in a rubber, a weight per volume becomes heavy, thus, fuel cost is increased, and further, there still remains room for improvement of run-flat durability, low heat build-up property, and strength at break.

DISCLOSURE OF INVENTION

An object of the present invention is to provide a rubber composition, which can make improvement in all of strength at break, low heat build-up property, run-flat durability and low fuel consumption, and a run-flat tire using the rubber composition.

The present invention relates to a rubber composition, comprising 5 to 120 parts by weight of a flake-like graphite having an average aspect ratio of 3 to 80 and an average particle diameter of 2 to 80 μm on the basis of 100 parts by weight of a diene rubber component.

It is preferable that a butadiene rubber is contained in the diene rubber component in an amount of 20 to 80% by weight.

It is preferable that the butadiene rubber is a butadiene rubber comprising syndiotactic-1,2-polybutadiene crystal.

It is preferable that the rubber composition has a strength at break of not less than 10 MPa, and a loss modulus $E''$ and a complex modulus $E^*$ satisfy the following equation (1):

$$E''/(E^*)^2 \leq 7.0 \times 10^{-9}\ \text{Pa}^{-1}$$

It is preferable that the rubber composition is used for a reinforcing rubber layer of a sidewall part.

The present invention also relates to a run-flat tire, which has a reinforcing rubber layer of a sidewall part using the rubber composition.

BEST MODE FOR CARRYING OUT THE INVENTION

The rubber composition of the present invention comprises the diene rubber component and the flake-like graphite.

Examples of the diene rubber component are, for instance, natural rubber (NR), epoxidized natural rubber (ENR), butadiene rubber (BR), styrene-butadiene rubber (SBR), isoprene rubber (IR), butyl rubber (IIR), acrylonitrile-butadiene rubber (NBR), chloroprene rubber (CR), styrene-isoprene-butadiene rubber (SIBR), styrene-isoprene rubber, and isoprene-butadiene rubber. These can be used alone or two or more kinds thereof may be used in combination. Among these, NR and BR are preferable for the reason that low heat build-up property is excellent.

As for NR, NR generally used in the rubber industries such as a grade of RSS#3 can be used.

A content of NR in the diene rubber component is preferably not less than 20% by weight, more preferably not less than 40% by weight from the viewpoint that a sufficient rubber strength can be obtained. The content of NR is preferably not more than 80% by weight, more preferably not more than 70% by weight from the viewpoint that low heat build-up property is excellent.

As for BR, BR comprising syndiotactic-1,2-polybutadiene crystal (SPB-containing BR) is preferable for the reason that a rubber having a high hardness can be obtained.

SPB-containing BR is not particularly limited, and VCR412 and VCR617 available from Ube Industries, Ltd. can be used.

A content of BR in the diene rubber component is preferably not less than 20% by weight, more preferably not less than 30% by weight from the viewpoint that low heat build-up property is excellent. The content of BR is preferably not more than 80% by weight, more preferably not more than 60% by weight from the viewpoint that a sufficient rubber strength can be obtained.

Flake-like in the flake-like graphite indicates a concept including shapes such as flake, disc, and the like, and satisfying the following average aspect ratio and average particle diameter. In the present invention, graphite means a layered graphite having a crystal structure of hexagonal plate-like form, and does not include a carbon black and the like.

An average aspect ratio of the flake-like graphite (ratio of a length to a thickness) is not less than 3, preferably not less than 5, more preferably not less than 10. When an average aspect ratio of the flake-like graphite is less than 3, a sufficient rubber hardness cannot be obtained. The average aspect ratio of the flake-like graphite is not more than 80, preferably not more than 30. When the average aspect ratio of the flake-like graphite is more than 80, the flake-like graphite hardly disperses into a rubber, and strength at break is lowered. The average aspect ratio is not particularly limited, and is obtained, for example, from an average length (a) and an average thickness (b) as a/b, by observing the flake-like graphites with an electron microscope and measuring lengths and thicknesses of optional 50 pieces of flake-like graphites.

An average particle diameter of the flake-like graphite is not less than 2 μm, preferably not less than 5 μm, more preferably not less than 10 μm. When the average particle diameter of the flake-like graphite is less than 2 μm, a sufficient rubber hardness cannot be obtained. The average particle diameter of the flake-like graphite is not more than 80 μm, preferably not more than 50 μm. When the average particle diameter of the flake-like graphite is more than 80 μm, breakage begins at the flake-like graphite, and flex fatigue resistance is lowered. The average particle diameter of the flake-like graphite is the aforementioned average length (a).

An amount of the flake-like graphite is not less than 5 parts by weight, preferably not less than 10 parts by weight, more preferably not less than 15 parts by weight on the basis of 100 parts by weight of the diene rubber component. When the amount of the flake-like graphite is less than 5 parts by weight, durability at run-flat running is inferior in the case where the rubber composition of the present invention is used for a run-flat tire. The amount of the flake-like graphite is not more than 120 parts by weight, preferably not more than 80 parts by weight, more preferably not more than 60 parts by weight. When the amount of the flake-like graphite is more than 120 parts by weight, the flake-like graphite hardly disperses into the rubber, and further, the rubber easily generates heat.

The rubber composition of the present invention comprises specified amounts of the diene rubber component and the specific flake-like graphite, and thereby reduction of a weight of a run-flat tire is intended, and strength and run-flat durability can be improved.

It is preferable that the rubber composition of the present invention further comprises a carbon black.

A nitrogen adsorption specific surface area ($N_2SA$) of the carbon black is preferably not less than 30 $m^2/g$, more preferably not less than 35 $m^2/g$ from the viewpoint that sufficient reinforcing property and durability can be obtained. $N_2SA$ of the carbon black is preferably not more than 100 $m^2/g$, more preferably not more than 80 $m^2/g$, further preferably not more than 60 $m^2/g$ from the viewpoint that low heat build-up property is excellent.

A dibutyl phthalate oil absorption (DBP) of the carbon black is preferably not less than 50 ml/100 g, more preferably not less than 80 ml/100 g from the viewpoint that sufficient reinforcing property can be obtained. A DBP of the carbon black is preferably not more than 300 ml/100 g, more preferably not more than 200 ml/100 g from the viewpoint that an elongation at break and fatigue resistance are excellent.

An amount of carbon black is preferably not less than 10 parts by weight, more preferably not less than 20 parts by weight, further preferably not less than 30 parts by weight on the basis of 100 parts by weight of the diene rubber component from the viewpoint that a sufficient rubber strength can be obtained. The amount of carbon black is preferably not more than 100 parts by weight, more preferably not more than 70 parts by weight, further preferably not more than 60 parts by weight from the viewpoint that a viscosity at kneading is appropriately maintained, and processability is excellent.

It is also preferable that the rubber composition of the present invention further comprises sulfur or a sulfur compound.

Insoluble sulfur is preferable as the sulfur or the sulfur compound for the reason that surface precipitation of sulfur is suppressed.

An average molecular weight of insoluble sulfur is preferably not less than 10,000, more preferably not less than 100,000, from the viewpoint that decomposition hardly occurs even at low temperature and surface precipitation is hardly caused. The average molecular weight of insoluble sulfur is preferably not more than 500,000, more preferably not more than 300,000 from the viewpoint that dispersibility in the rubber is excellent.

An amount of sulfur or sulfur compound is preferably not less than 3 parts by weight, more preferably not less than 4 parts by weight on the basis of 100 parts by weight of the diene rubber component from the viewpoint that a sufficient hardness is obtained, bending hardly occurs, and thus the rubber hardly breaks. The amount of sulfur and sulfur compound is preferably not more than 20 parts by weight, more preferably not more than 15 parts by weight from the viewpoint that blooming is hardly caused, and sufficient processability can be obtained.

It is also preferable that the rubber composition of the present invention further comprises a vulcanization accelerator.

Examples of the vulcanization accelerator are N-tert-butyl-2-benzothiazolyl sulfenamide (TBBS), N-cyclohexyl-2-benzothiazolyl sulfenamide (CBS), N,N'-dicyclohexyl-2-benzothiazolyl sulfenamide (DZ), mercaptobenzothiazol (MBT), dibenzothiazolyldisulfide (MBTS), and diphenyl guanidine (DPG), and sulfenamide vulcanization accelerators such as TBBS, CBS, and DZ are preferable for the reasons that such sulfenamide vulcanization accelerators as a slow-acting vulcanization accelerator hardly cause scorch in a preparation process, vulcanization characteristics are excellent, low heat build-up property is excellent for deformation caused by external force in rubber properties after vulcanization, and an effect of improving durability of a run-flat tire is large.

In the rubber composition of the present invention, additives conventionally used in the rubber industries such as stearic acid, zinc oxide, various antioxidants, wax, and oil can be suitably compounded according to necessity, in addition to the aforementioned diene rubber component, flake-like graphite, carbon black, sulfur or sulfur compound, and vulcanization accelerator.

The rubber composition of the present invention is prepared by a general process. Namely, the aforementioned rubber component, paper fiber, filler, and according to need, other additives are kneaded with a banbury mixer, a kneader, an open roll or the like, then the kneaded mixture is vulcanized, and thereby the rubber composition of the present invention can be prepared.

In the rubber composition of the present invention after the vulcanization, strength at break (TB) is preferably not less than 10 MPa, more preferably not less than 12 MPa, further preferably not less than 14 MPa from the viewpoint that the rubber composition is hardly broken due to a load of a vehicle at run-flat running, and sufficient run-flat performance is obtained. The upper limit of TB is not particularly set, and is generally preferably not more than 30 MPa.

In the rubber composition of the present invention after the vulcanization, a loss modulus (E'') and a complex modulus (E*) at 70° C. preferably satisfy the following equation (1):

$$E''/(E^*)^2 \leq 7.0 \times 10^{-9} \text{ Pa}^{-1}$$

$E''/(E^*)^2$ is preferably not more than $7.0 \times 10^{-9}$ $Pa^{-1}$, more preferably not more than $6.0 \times 10^{-9}$ $Pa^{-1}$ from the viewpoint that the rubber hardly generates heat at run-flat running, thermal deterioration of the rubber can be suppressed and the rubber hardly breaks. The lower limit of $E''/(E^*)^2$ is not particularly set, and generally preferably not less than $1.0 \times 10^{-9}$ $Pa^{-1}$.

It is preferable that the rubber composition of the present invention is used for a reinforcing rubber layer of a sidewall part of a run-flat tire. Herein, the reinforcing rubber layer of a sidewall part means a lining strip layer arranged between a sidewall part and a carcass part of the run-flat tire. Because the reinforcing rubber of a sidewall part exits in the run-flat tire, a vehicle can be supported even when an air pressure of the tire is decreased, and excellent run-flat durability can be imparted.

The run-flat tire of the present invention can be prepared by a general process using the rubber composition of the present invention. Namely, the rubber composition of the present invention compounded with the aforementioned additives according to the necessity is extrusion-processed while being adjusted to a shape of the reinforcing rubber layer of a sidewall part of the tire in the unvulcanized stage, and molded on a tire molding machine together with other tire parts to form an unvulcanized tire. This unvulcanized tire is heated and pressurized in a vulcanizer to obtain a run-flat tire.

EXAMPLES

The present invention is specifically explained by means of Examples, but the present invention is not limited only thereto.

Various chemicals used in Examples and Comparative Examples are collectively described in the following.

Natural rubber (NR): RSS#3

Butadiene rubber (BR): VCR412 (average particle diameter of SPB: 250 nm, content of SPB: 12% by weight) available from Ube Industries, Ltd.

Carbon black (FEF): DIABLACK E ($N_2SA$: 41 $m^2/g$, DBP oil absorption: 115 ml/100 g) available from Mitsubishi Chemical Corporation Flake-like graphite: BF-18A (aspect ratio: 40, average particle diameter: 18 μm) available from CHUETSU GRAPHITE WORKS CO., LTD.

Sericite: KM-8 (aspect ratio: 15, average particle diameter: 17 μm) available from Nippon Forum Co., Ltd.

Stearic acid: Tsubaki available from NOF Corporation

Zinc oxide: Zinc oxide No. 2 available from Mitsui Mining & Smelting Co., Ltd.

Antioxidant: ANTIGENE 6C (N-(1,3-dimethylbutyl)-N'-phenyl-p-phenylenediamine) available from Sumitomo Chemical Co., Ltd.

Silane coupling agent: Si-75 (bis(triethoxysilylpropyl)disulfide) available from Degussa Co.

Insoluble sulfur: Mu-cron OT available from SHIKOKU CHEMICALS CORPORATION

Vulcanization accelerator: NOCCELER NS (N-t-butyl-2-benzothiazolyl sulfenamide) available from Ouchi Shinko Chemical Industrial Co., Ltd.

Examples 1 and 2 and Comparative Examples 1 and 2

According to compounding formulation shown in Table 1, using a banbury mixer manufactured by Kobe Steel, Ltd., chemicals other than sulfur and a vulcanization accelerator were kneaded at 150° C. for 4 minutes to obtain a kneaded product. Then, using an open roll, the sulfur and vulcanization accelerator were added to the obtained kneaded product, and the mixture was kneaded for 3 minutes under 80° C. to obtain an unvulcanized rubber composition. Further, the obtained unvulcanized rubber composition was molded into a shape of a reinforcing rubber layer of a sidewall part of a tire, laminated with other tire parts, and vulcanized to prepare run-flat tires (tire size: 215/45ZR17) of Examples 1 and 2 and Comparative Examples 1 and 2.

(Tensile Test)

A test piece having a thickness of 2 mm was cut out from a lining strip layer of a run-flat tire. According to JIS K6251 "Rubber, vulcanized or thermoplastic—Determination of tensile stress-strain properties", the tensile test was carried out, using a No. 3 dumbbell, and strength at break (TB) of each composition was measured. The larger TB is, the more excellent the strength is.

(Viscoelasticity Test)

Viscoelasticity (complex modulus E* and loss modulus E") at 70° C. was measured using the aforementioned test pieces under the conditions of a frequency of 10 Hz, an initial strain of 10%, and a dynamic strain of 1% to calculate $E''/(E^*)^2$ with an viscoelasticity spectrometer manufactured by Iwamoto Seisakusyo K.K. The smaller a value of $E''/(E^*)^2$ is, the more excellent low heat build-up property is.

(Weight of a Tire)

A weight of a run-flat tire of each composition was measured, and a weight difference (g) of a tire of each composition was calculated on the basis of the weight (12.60 kg) of the tire of Comparative Example 1 by the following equation (2):

(Weight difference of tire)=(Weight of a tire of each composition)−(Weight of a tire of Comparative Example 1)

The smaller the weight difference is, the more satisfactory low fuel consumption is.

(Run-Flat Performance)

The aforementioned run-flat tire was run on a drum at a speed of 80 km/hour under an inner pressure of 0 kPa, and a running distance until the tire was broken was measured. According to the equation (3):

(Run-flat performance index)=(Running distance of each composition)÷(Running distance of Comparative Example 1)×100 the running distance was expressed as an index (run-flat performance index), assuming Comparative Example 1 is 100. The larger the run-flat performance index is, the more excellent run-flat durability is.

Evaluation results of the aforementioned tests are shown in Table 1.

TABLE 1

|  | Ex. 1 | Ex. 2 | Com. Ex. 1 | Com. Ex. 2 |
|---|---|---|---|---|
| Amounts (part by weight) | | | | |
| NR | 70 | 70 | 70 | 70 |
| BR | 30 | 30 | 30 | 30 |
| Carbon black | 50 | 35 | 50 | 50 |
| Flake-like graphite | 30 | 50 | — | 3 |
| Sericite | — | — | 30 | — |
| Stearic acid | 2 | 2 | 2 | 2 |
| Zinc oxide | 3 | 3 | 3 | 3 |
| Antioxidant | 1 | 1 | 1 | 1 |
| Silane coupling agent | — | — | 3 | - |
| Insoluble sulfur | 5 | 5 | 5 | 5 |
| Vulcanization accelerator | 2 | 2 | 2 | 2 |
| Evaluation results | | | | |
| TB (MPa) | 15.6 | 15.8 | 15.2 | 14.8 |
| $E''/(E^*)^2$ ($10^{-9}$ $Pa^{-1}$) | 4.1 | 3.7 | 4.3 | 8.3 |
| Difference of tire weight (g) | −180 | −90 | 0 | −290 |
| Run-flat performance index | 102 | 106 | 100 | 62 |

INDUSTRIAL APPLICABILITY

According to the present invention, there can be provided a rubber composition comprising specified amounts of a diene rubber component and a specific flake-like graphite, in which all of strength at break, low heat build-up property, run-flat durability and low fuel consumption can be improved, and a run-flat tire using the rubber composition.

The invention claimed is:

1. A rubber composition, comprising 5 to 120 parts by weight of a flake-like graphite having an average aspect ratio of 3 to 80 and an average particle diameter of 2 to 80 μm on the basis of 100 parts by weight of a diene rubber component;
   wherein said diene rubber component comprises 20 to 80% by weight of a butadiene rubber; and wherein the graphite is layered graphite having a crystal structure of hexagonal, plate-like form.

2. The rubber composition of claim 1, wherein said butadiene rubber is a butadiene rubber comprising syndiotactic-1,2-polybutadiene crystal.

3. The rubber composition of claim 1, wherein a strength at break is not less than 10 MPa, and a loss modulus E" and a complex modulus E* satisfy the following equation (1):

$$E''/(E^*)^2 \leq 7.0 \times 10^{-9} \, Pa^{-1}.$$

4. The rubber composition of claim 1, which is used for a reinforcing rubber layer of a sidewall part.

5. A run-flat tire, which has a reinforcing rubber layer of a sidewall part prepared by using the rubber composition of claim 1.

6. The rubber composition of claim 1, wherein the graphite is substantially free of carbon black.

7. A reinforcing rubber layer of a sidewall part of a tire which comprises a rubber composition, comprising 5 to 120 parts by weight of a flake-like graphite having an average aspect ratio of 3 to 80 and an average particle diameter of 2 to 80 μm on the basis of 100 parts by weight of a diene rubber component, wherein said graphite is layered graphite having a crystal structure of hexagonal, plate-like form; and
wherein said diene rubber component comprises 20 to 80% by weight of a butadiene rubber.

8. A run-flat tire having an improved strength at break, a low heat build-up property, improved run-flat durability and a low fuel consumption, which comprises a rubber composition, comprising 5 to 120 parts by weight of a flake-like graphite having an average aspect ratio of 3 to 80 and an average particle diameter of 2 to 80 μm on the basis of 100 parts by weight of a diene rubber component, wherein the graphite is layered graphite having a crystal structure of hexagonal, plate-like form; and
wherein said diene rubber component comprises 20 to 80% by weight of a butadiene rubber.

9. The run-flat tire of claim 8, wherein said butadiene rubber is a butadiene rubber comprising syndiotactic-1,2-polybutadiene crystal and the graphite is substantially free of carbon black.

* * * * *